No. 699,164. Patented May 6, 1902.
J. R. GORSUCH.
WIRE TWISTING PLIERS.
(Application filed June 26, 1901.)
(No Model.)
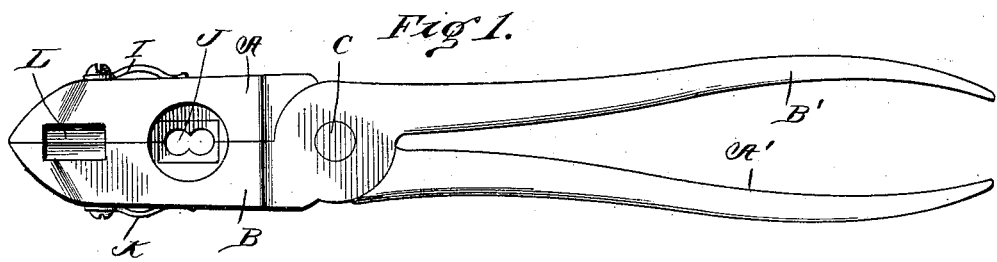
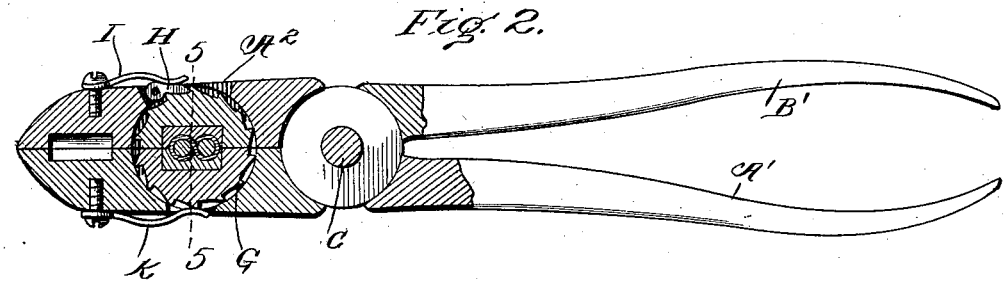
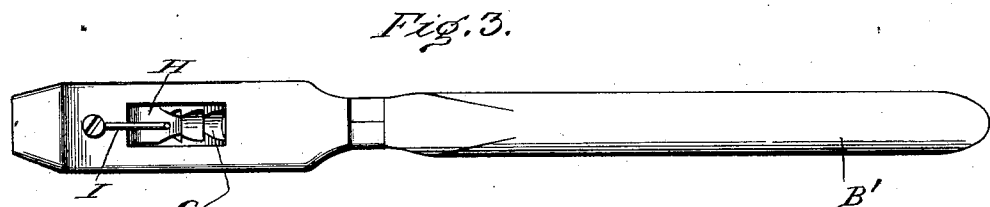
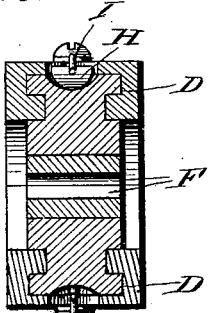
Witnesses
Fred J. Hartman
E. A. Morrison
Inventor
John R. Gorsuch.
By his Attorney
W. Preston Williamson
THE NORRIS PETERS CO., PHOTO-LITHO., WASHINGTON, D. C.

UNITED STATES PATENT OFFICE.

JOHN R. GORSUCH, OF PHILADELPHIA, PENNSYLVANIA.

WIRE-TWISTING PLIERS.

SPECIFICATION forming part of Letters Patent No. 699,164, dated May 6, 1902.

Application filed June 26, 1901. Serial No. 66,079. (No model.)

*To all whom it may concern:*

Be it known that I, JOHN R. GORSUCH, a citizen of the United States, residing at Philadelphia, county of Philadelphia, and State of Pennsylvania, have invented a certain new and useful Improvement in Twisting-Pliers, of which the following is a specification.

My invention relates to a new and useful improvement in twisting-pliers, and has for its object to provide a pair of pliers which is adapted to twist together two wire rods or other articles of this character and provide ratchet mechanism carried in the jaws of the pliers. This twisting can be done without releasing the hold upon the object to be twisted.

The particular purpose of my invention is for joining together electric wires by the use of what is known as the "McIntire" sleeve. This consists of two tubes joined together through which the ends of the wire to be joined are passed. This sleeve is then twisted, twisting the wire with it, which will make a connection which will resist a great amount of tensile strain.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 is a side elevation of my pliers; Fig. 2, a longitudinal section of the same; Fig. 3, a plan view; Fig. 4, a perspective view of the two ratchet-jaws; Fig. 5, a section on the line 5 5 of Fig. 2, and Fig. 6 a view showing a connection made by the McIntire sleeve.

In carrying out my invention as here embodied the pliers are composed of the two jaws A and B, which are pivoted together at C and have formed with them the handles A' and B'. The jaws A and B have formed in them the semicircular grooves D, which extend inward from the inner face of the jaws, and when the two jaws are brought together these semicircular grooves together will form a perfect circle. E are two semicircular blocks which have formed upon each of their sides the flanges E', which flanges are adapted to fit within the grooves D in the jaws of the pliers. When these two blocks are placed together, they form a circle, so that when they are within the grooves D and the jaws are together these blocks will turn together freely within the grooves. The flat face of each of these semicircular blocks has formed in it semicircular grooves F. These grooves are so formed that when the two blocks are placed together they will not form two separate holes, but will form an opening shaped like the figure 8. Around the periphery of each of the semicircular blocks E are formed the ratchet-teeth G.

An opening $A^2$ is formed through the jaw A from the groove D to the exterior of said jaw, and within this opening is pivoted the pawl H, which is adapted to engage the ratchet-teeth G in the block. A spring I is adapted to hold the pawl in engagement with such teeth. It is obvious now that if the jaws of the pliers are opened it will also separate the blocks E. Two wires or a sleeve connection, as shown in Fig. 6, can be grasped and will lie within the opening J, formed by the four semicircular grooves F, and the same wire and sleeve can be grasped by another instrument in the same manner at a distance therefrom, and if the tools rocked in opposite directions the wire or sleeve between the two tools will be twisted, and the pliers do not need to be opened to get a fresh grip upon the articles to be twisted, for when the tool is moved in one direction the pawl will engage the teeth of the blocks and cause the same to twist the wire or sleeve, and when the tool is moved in the opposite direction the pawl will be caused to slip over the teeth of the ratchet to secure a new hold when the motion of the tool is reversed. As one of the blocks not engaged by the pawl H is free to move to hold the same against accidental displacement I provide the friction-spring K, which is a light spring with just sufficient tension to hold the block against the rotation within the groove D by its own weight.

The principal advantage of my invention is when it is used for connecting together electric wires where the McIntire sleeve is used for making the connection. In the tools now used the grip upon one end of the sleeve has to be relieved at every turn, and when working in cramped quarters it is almost impossible at times to make a connection because of this fact. With my invention as long as there is sufficient room to allow for enough movement of the tool so that the pawl will catch a new tooth in the movement the connection can be made, and on account of this ratchet mechanism a twist can be given to the wire or sleeve in much shorter space of time than by the old method. In pliers this ratchet mechanism may be combined with wire-cutters (shown in the drawings at L) located in the ends of the jaws. The ratchet-twisters could be located in the ends of the jaws and the wire-cutters brought nearer the fulcrum, if desired; but this feature forms no part of my invention. Therefore it is not necessary to go into details relative to the same.

Of course I do not wish to be limited to the exact construction here shown, as slight modifications could be made without departing from the spirit of my invention.

Having thus fully described my invention, what I claim as new and useful is—

1. In a tool of the character described, two jaws pivoted together, handles formed with said jaws, semicircular grooves formed within the jaws, semicircular blocks, flanges formed upon each side of the blocks, said flanges adapted to enter and rotate within the grooves in the jaws, ratchet-teeth formed upon the periphery of the semicircular block, a pawl pivoted in one of the jaws and adapted to engage the ratchet-teeth, semicircular grooves formed laterally across the flat face of each of the semicircular blocks, said grooves adapted to register with one another when the blocks are brought together for the purpose of grasping the article to be twisted, substantially as described and for the purpose set forth.

2. In combination with a pair of pliers, two semicircular blocks, grooves formed laterally across the flat faces of said semicircular blocks for the purpose of grasping the articles to be twisted, means for guiding the semicircular blocks within the jaws of the pliers so as to allow said blocks to rotate when the jaws are together, ratchet-teeth formed in the periphery of the semicircular blocks, a pawl pivoted in one of the jaws of the pliers and adapted to engage the ratchet-teeth, a spring adapted to hold the pawl in engagement with the ratchet-teeth, and a frictional spring adapted to bear against the block opposite from the one in engagement with the pawl, substantially as and for the purpose specified.

In testimony whereof I have hereunto affixed my signature in the presence of two subscribing witnesses.

JOHN R. GORSUCH.

Witnesses:
H. B. HALLOCK,
L. W. MORRISON.